United States Patent [19]

Lenneper

[11] 4,012,740
[45] Mar. 15, 1977

[54] RADIO-FREQUENCY DIRECTION-FINDING ARRANGEMENT

[75] Inventor: Wilhelm Lenneper, Bad Herrenalb, Germany

[73] Assignee: International Standard Electric Corporation, New York, N.Y.

[22] Filed: Sept. 5, 1975

[21] Appl. No.: 610,650

[52] U.S. Cl. .............................. 343/118; 343/16 M
[51] Int. Cl.$^2$ ........................ G01S 3/58; G01S 9/22
[58] Field of Search .......................... 343/118, 16 M

[56] References Cited
UNITED STATES PATENTS

| | | | |
|---|---|---|---|
| 3,146,448 | 8/1964 | Shelley | 343/118 |
| 3,728,730 | 4/1973 | Takao et al. | 343/16 M |

Primary Examiner—Maynard R. Wilbur
Assistant Examiner—Richard E. Berger
Attorney, Agent, or Firm—William T. O'Neil

[57] ABSTRACT

A scanning radio-frequency direction finder which includes two synchronously scanned beams (antenna patterns) having their boresite (symmetry) axes angularly offset by a predetermined amount, either physically or by control of time of operation. A first of the beams is double-lobed with a null at its boresite while the second has its maximum at its boresite. The signals received through each pattern are continuously phase measured and the phase of signals through the second beam is stored when the received signal strength therethrough reaches a predetermined value. The continuously measured first beam signal phase is compared with the aforementioned stored second beam signal phase, the instantaneous scan angle of the first beam at the time of phase equality being taken as the correct angle of the target reflector or source of received signals (target). The result is much improved angle measurements, especially in elevation at low angles.

9 Claims, 23 Drawing Figures

RADIO-FREQUENCY DIRECTION-FINDING ARRANGEMENT

BACKGROUND OF THE INVENTION

1. Field of the Invention

The present invention relates generally to scanning radio-frequency direction-finding arrangements, and more particularly to such systems employing sum and difference beam patterns.

2. Description of the Prior Art

Such direction-finding arrangements are known in prior art technical literature, e.g., the text "Radar Handbook" (McGraw-Hill, 1970), P. 21–13, (by Merrill Skolnik), where in connection with a monopulse tracking radar a so-called difference pattern, having a minimum in the symmetry (boresite) axis, and a so-called sum pattern, having a maximum in the symmetry (boresite) axis, are used. In such direction-finding arrangements, which are employed to determine the direction of radiating targets, large multipath errors may be caused by the superposition of the radiation coming directly from the target and the indirect radiation arriving at the direction finder by way of interfering reflectors (the ground for example). If direction finder and target have only a small height above ground, angle measurements (in the vertical plane mainly) will be disturbed by the so-called specular reflection.

Figure 1:
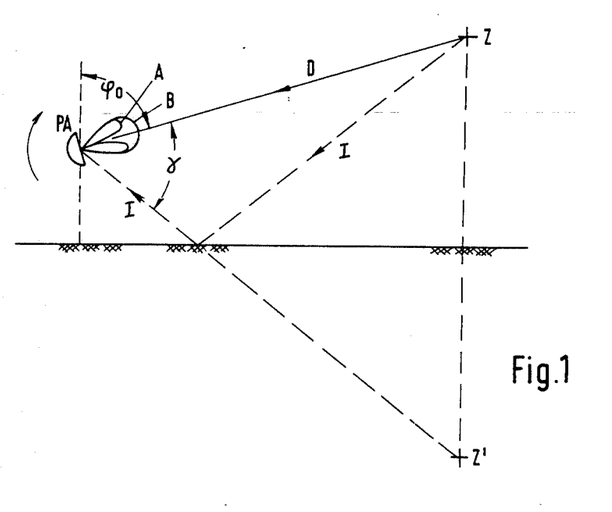
FIG. 1 is a geometric representation of specular reflection.

As shown in FIG. 1, during radar elevation measurements, the earth's surface acts as a reflector. The reflecting cross-section of the earth's surface can become very large, causing the indirect radiation I travelling from the target Z to a direction-finding antenna by way of the earth's surface to be of the same order of strength as the useful or direct radiation D. Such reflection interference, which is sometimes called "specular reflection" because the interference seems to emanate from the mirror image Z' of the target Z (FIG. 1), causes unacceptably large direction-finding errors.

It is known to reduce the influence of multipath interference on the direction-finding accuracy by putting obstacles in the way of the indirect radiation and thereby intercepting it. In the radar arrangement described in Vol. 3 of "Die Funkmessgerate der deutschen Flakartillerie" of the Bucherei fur Funkortung, Verkehrsund Wirschaftsverlag GmbH Dortmund, pp. 117 to 119, for example, attempts were made to suppress the rays reflected from the earth's surface during angle measurements in the vertical plane by means of metallic shields attached to the underside of the radar antenna or by earth embankments. These measures are not useful if the solid angle between direct radiation D and indirect radiation I becomes very small, which is the case if direction-finder and target have a very small height above ground. This is inherently the case when a shipboard radar for the detection of missiles flying barely above the water-surface, and also in connection with fire-control radar for antitank defense.

In addition, the prior art techniques are unsuitable for mobile applications.

The manner in which the present invention affords greatly improved target angle determination will be understood as this description proceeds.

SUMMARY OF THE INVENTION

It may be said to have been the general object of the invention to provide a radio-frequency direction-finding arrangement which greatly reduces the influence of multipath on direction-finding accuracy. The invention accomplishes this objective using electronic means readily applied in mobile equipment, and is basically adapted to passive direction-finding or active radars.

The direction-finding arrangement in accordance with the invention permits a substantial improvement in direction-finding accuracy as compared to the known amplitude-comparison techniques, which use the amplitude minimum of the resulting voltage UA (point 5, FIG. 3c) for target angle measurement.

BRIEF DESCRIPTION OF THE DRAWINGS

FIG. 3($a$) shows the angular dependence of the received signal voltage DA derived from the direction radiation and corresponding to the pattern A of FIG. 2, and the corresponding angular dependence of the received voltage IA derived from the indirect radiation.

FIG. 3($b$) is the phasor diagram for FIG. 3a, showing the received voltage UA resulting from the pattern A of FIG. 2.

FIG. 3($c$) shows the angular dependence of the resulting received voltage UA and the latter's phase characteristic $\psi A$.

FIG. 3($d$) shows the angular dependence of the received voltage DB derived from the direct radiation and corresponding to the pattern B of FIG. 2, and the corresponding angular dependence of the received voltage IB derived from the indirect radiation.

FIG. 3($e$) is the phasor diagram for FIG. 3($d$), showing the received voltage UB resulting from the pattern B of FIG. 2.

FIG. 3($f$) shows the angular dependence of the resulting received voltage UB and the latter's phase characteristic $\psi B$.

FIG. 6($a$) shows the angular dependence of the resulting received voltages UA and UB derived from the two patterns A and B and present in the arrangements of FIGS. 4 and 5.

FIG. 6($b$) shows the respective phase characteristics for the signal voltages of FIG. 6($a$).

FIGS. 8$a$ and 8$b$ show the resulting received voltages UA and UB present in the arrangement of FIG. 7, and the respective phase characteristics $\psi A$ and $\psi B$.

DESCRIPTION OF THE PREFERRED EMBODIMENTS

Referring now to FIG. 1, two (sum and difference) patterns are produced by, e.g., one direction-finding antenna PA, as shown in FIG. 1; pattern A having a minimum along the symmetry axis, and pattern B having a maximum along the symmetry axis. These patterns, shown in polar coordinates, correspond to the voltage characteristics also designated A and B in FIG. 2 and varying with the scanning angle φ. Hereinafter these voltage characteristics will also be referred to as "radiation patterns" or "directional patterns" or simply as "patterns." Such patterns A and B can be produced in known manner as "virtual patterns." FIG. 2 indicates such a possibility, in which virtual directional patterns of the type A with a minimum in the symmetry axis (angle φ = φs) and of the type B with a maximum in the symmetry axis (φ = φs) are produced, e.g., by the monopulse technique from the patterns 1 and 2 of two antennas displaced from each other by a given angle (φ'), by subtracting and adding the antenna voltages corresponding to the patterns 1 and 2. It is inconsequential with respect to the invention whether the patterns of the types A and B are such "virtual patterns" or "real" ones produced by suitable antennas.

Figure 3A:
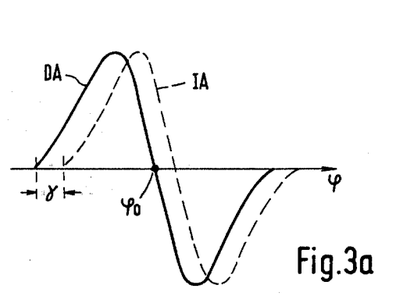
Figure 3B:
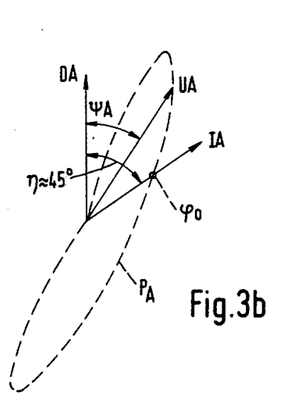
Figure 3C:
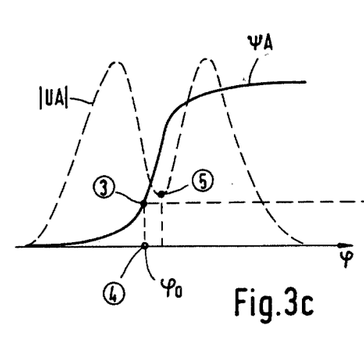
Figure 3D:
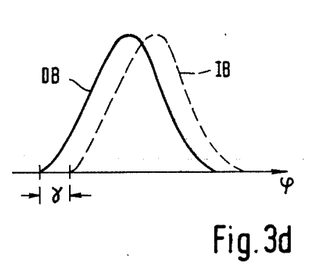

If the directional patterns A and B produced by the direction-finding antenna PA (FIG. 1) are scanned across the target area by mechanical or electronic control of the antenna, the radio-frequency radiation reflected from a point fixed target Z (target angle φo) and arriving at the direction-finding antenna DA over the direct path D will cause at the antenna output to have a voltage characteristic varying with the scanning angle φ which characteristic is designated DA [FIG. 3(a)] for the pattern A amd DB [FIG. 3(d)] for the pattern B. The interfering radiation I, which, in addition to the direct radiation D, arrives at the direction-finding antenna PA over an indirect path, comes from a direction which, together with the direction of the direct radiation D, forms the angle γ. Furthermore, a phase difference η generally exists between the direct radiation D and the indirect radiation I. If the direct radiation D and the indirect radiation I had the same amplitude, and if the indirect radiation I were present alone, the voltage curve designated IA in FIG. 3(a) and corresponding to the pattern A would be obtained, while the curve IB of FIG. 3(d) shows the voltage for the pattern B which would be developed under the same conditions. In reality, an operator can only observe the resulting combined received signals UA [FIG. 3(c)] and UB [FIG. 3(f)] which follow from the superposition of the direct and indirect radiation components DA, IA and DB, IB, respectively.

Figure 3E:
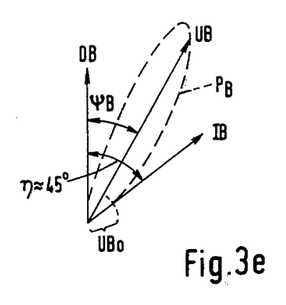

FIG. 3(b) shows the phasor diagram of the voltage UA resulting from DA and IA, assuming that η = 45° and that the maximum values of DA and IA are equal. $P_A$ represents the locus for the phasor of the voltage UA. FIG. 3(e) shows the phasor diagram of the voltage UB composed of DB and IB, for which the same assumptions are made. $P_B$ is the locus of the phasor of the voltage UB. From FIGS. 3(a) and 3(b) follows the variation in the magnitude of UA and in the corresponding phase ψA shown in FIG. 3(c) in rectangular coordinates as a function of the scanning angle φ.

Figure 3F:
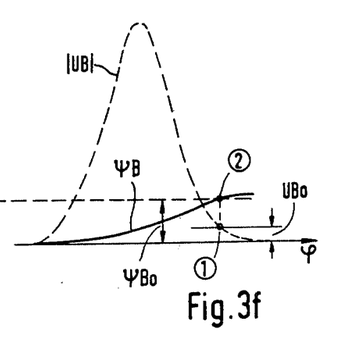

From FIGS. 3(d) and 3(e) follows the corresponding variation in the magnitude of UB and in the associated phase ψB, shown in FIG. 3(f).

As can be seen in FIG. 3(a), the direct radiation corresponding to the pattern A disappears when its symmetry axis passes through the target angle φo [DA (φo) = O], therefore, the amplitude and the phase of the resulting voltage UA at the angle (φo) depend only on the indirect radiation component [FIG. 3(b)]. Accordingly, the phase coincidence between the indirect signal IA and the resulting signal UA can be used for the determination of the target angle. Since the phases to be compared are related to the phase of the direct component DA, the symmetry axis of the pattern A will pass through the target (φ=φo) when the phase ψ A of the resulting voltage UA is equal to the phase angle η [FIG. 3(b)]. Since the phase angle η is unknown to the operator, recourse is had to the pattern B for the measurement of the target angle φo. As can be seen from the phasor diagram [FIG. 3(e)] of the resulting voltage UB, the value of the phase angle ψB also approximates the value η when the amplitude UB approximates the value O.

According to the invention, this fact is used in the following manner to determine the target angle:

The scanning angle φ associated with the pattern A is marked as the target angle when the phase ψA is equal to a value ψBo which the phase ψB of the voltage UB has when the latter reaches a predetermined value UBo.

For the realization of this inventive idea, two coordinate solutions to the problem are described, the first of these solutions according to the invention being now explained.

In order that the phase value ψBO is measured as short a time as reasonably possible prior to the attainment of the target angle φo, in this solution given, the two patterns A and B are synchronously directed over the target region in such a manner that the pattern B scans across the target region prior to the pattern A. The scanning motion is advantageously toward the indirect radiation, i.e., downwards, as seen on (FIG. 1).

Figure 4:
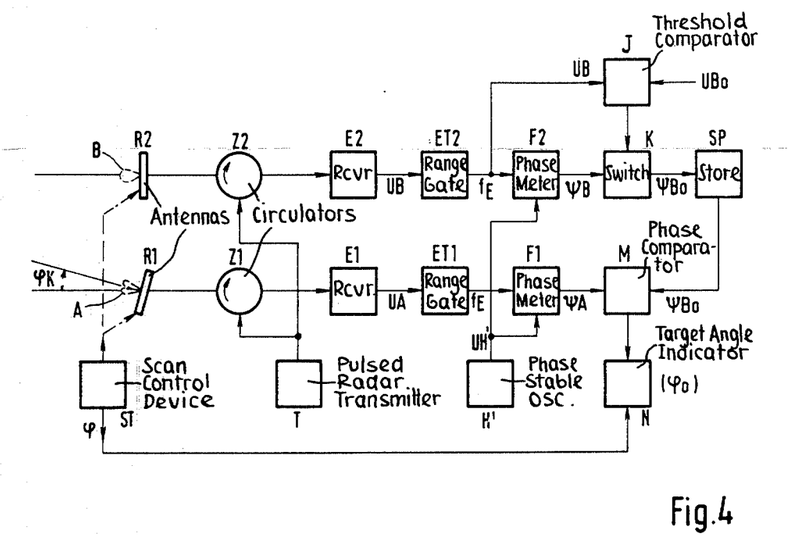
FIG. 4 is a block diagram of an embodiment of the rf direction-finding arrangement according to the invention in which the symmetry axes of the two radiation patterns are displaced from each other by a given angle, and in which the two patterns are switched on simultaneously.

A first possibility of achieving this time sequence is shown in FIG. 4 for a tracking radar.

The radiation pattern A is produced with an antenna R1, and the radiation pattern B with an antenna R2.

Figure 6A:
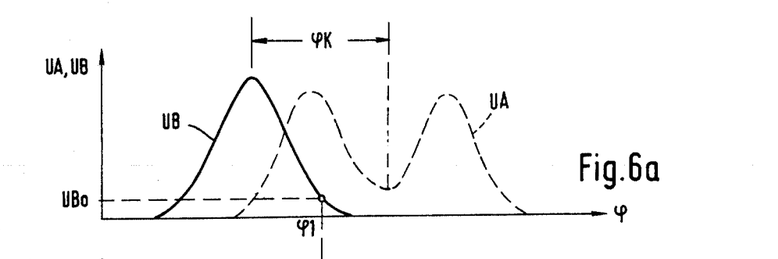
Figure 6B:
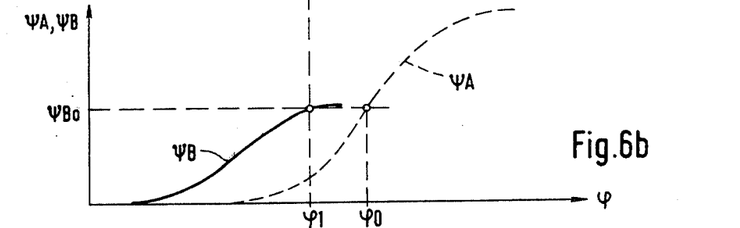

The two antennas R1 and R2 and, consequently, the symmetry axes of the two radiation patterns are displaced from each other by an angle φk, whereby the antenna output voltages UA and UB are out of phase with each other, see also [FIG. 6(a)]. In this arrangement, the phase value ψBO must be stored until the comparison with ψA can be effected, since the ψBO measurement takes place at φ1 and, consequently, before the target angle φo is attained. Circulators Z1 and Z2 connect the two antennas R1 and R2 to a pulsed radar transmitter T during the transmit period and to receivers E1 and E2 during the receive period. For measuring the elevation angle of a target, a scanning control device ST moves both antennas simultaneously in the elevation plane in the angular sense toward the indirect radiation, i.e., downwards. The two antennas are so displaced from each other that the radiation pattern B scans the target area before the radiation pattern A.

The $i$-$f$ outputs of the receivers E1 and E2 are connected via range gates ET1 and ET2 to phase meters F1 and F2 which measure the phases $\psi A$ and $\psi B$ of the voltages UA and UB in relation to a reference voltage UH' generated by a phase-stable oscillator H'. The frequency of this reference voltage UH' must be equal to the intermediate frequency $f_z$ if the target is not moving, as will be assumed first. Additional steps for generating the reference voltage if the target is moving will be explained hereinafter in connection with FIG. 9.

The range gates ET1 and ET2 are controlled, in known manner, in a servo loop (not shown) which is closed for range tracking as soon as the tracking radar has locked onto a target. If the voltage UB at the output of ET2 falls below a predetermined value UBO (10 to 15 db below the normal maximum value), while the radiation patterns are being scanned across the target area, a threshold comparator stage J will provide an output signal which closes a switch K. As a result, the phase value $\psi B = \psi Bo$ measured by F2 at that instant is passed on to a store SP. In a comparator stage M, the stored value $\psi Bo$ is continuously compared with the phase value $\psi A$ of the voltage UA appearing at the output of the phase meter F1. If the phase values $\psi A$ and $\psi Bo$ are equal to one another, a signal will be developed at the output of M which signal blocks the scanning angle $\phi$ continuously measured by the antenna control unit ST and indicated in N, whereby N now indicates the target angle $\phi o$.

The measurement of $\psi Bo$ must be finished ($\phi = \phi 1$, FIG. 6) before the symmetry axis of the radiation pattern A passes through the direction of the target ($\phi = \phi o$). On the other hand, the same distance between the measurements of $\psi B$ and $\phi o$ must not become too large to avoid measurement errors due to variations in the phase values with time. This is achieved by making the angular distance between the two patterns ($\phi k$) slightly greater than the half-power beamwidth of the pattern B.

The use of two separate antennas which both must be relatively large to achieve sufficient beam concentration presents considerable difficulties in mobile installations. Accordingly, the second embodiment is constructed with one basic antenna structure and electronic means to accomplish the equivalent of the beam angle offset contemplated in connection with FIG. 4.

Figure 5:
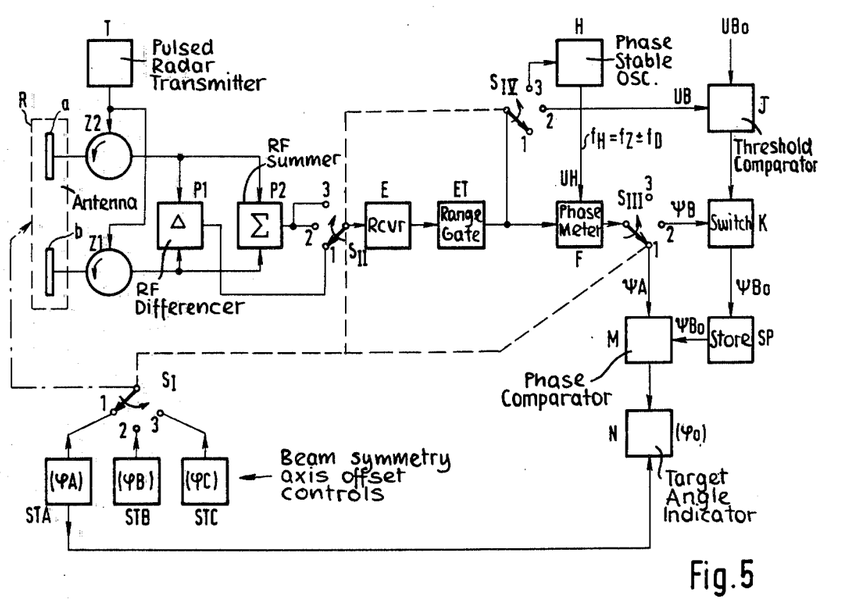
FIG. 5 is a block diagram of an embodiment of the rf direction-finding arrangement according to the invention in which the symmetry axes of the two radiation patterns are displaced from each other by a given angle at the instant they become effective, the two patterns being switched on one after the other.

FIG. 5 shows a system for producing two patterns with a more compact antenna structure which operates as if the pattern B were so displaced from the pattern A as to scan the target area before the pattern A (see also FIG. 6).

In the FIG. 5 system, the directional patterns A and B (FIG. 2) are produced by a common antenna R, but the patterns are used for the phase measurement sequentially. The patterns are steadily scanned across the target area, and each time the pattern B is used for the phase measurement, the scanning angle $\phi$ is enlarged by a given value ($\phi k$) with respect to the value set for the phase measurement of the received voltage UA. In the embodiment of FIG. 5, the directional patterns A and B (like a pattern C which is spaced-fixed during the phase measurement, to be explained below) are obtained using a single antenna R and with the aid of an RF difference stage P1 and an RF sum stage P2. P1 is used to produce the difference pattern A, while the sum patterns B and C are produced with P2.

The antenna voltages corresponding to the individual patterns are switched on sequentially on a time-division multiplex basis by switches $S_I$ through $S_{IV}$ operated synchronously with the pulse rhythm. The positions I of these switches corresponds to the radiation pattern A, the positions 2 to the radiation pattern B, and the positions 3 to the radiation pattern C. In the various switch positions, the scanning angles and, consequently, the symmetry axes of the individual patterns A, B, C can be influenced independently of each other. This is done by means of electronic beam symmetry axis offset control units STA (for pattern A), STB (for pattern B), and STC (for pattern C).

The control unit STC sets a constant angular value for the space-fixed pattern C each time the latter is switched on. The scanning angles of the patterns A and B differ by the constant angle $\phi k$. Whenever the patterns A and B are switched on, the range of scanning angles is uniformly enlarged, the patterns A and B being scanned downwards and pattern B scanning the target area before pattern A.

In the switch position 2, the sum voltage UB is applied from the sum stage P2 via the switch $S_{II}$, to a receiver E, and a range gate ET to the phasemeter F, whose output voltage, which corresponds to the phase value $\psi B$, is applied to the switch K. This switch is closed as soon as the voltage UB applied via the switch $S_{IV}$ to a threshold comparator stage J reaches the predetermined value UBO. At that instant, the phase value $\psi BO$ measured in F is passed through the switches $S_{III}$ and K to a storage device SP and stored there. In the switch position 1, the phase $\psi A$ of the difference voltage formed in P1 is measured, passed through $S_{III}$ to a comparator stage M, and compared there with the phase value $\psi BO$ stored in SP. In case of phase coincidence, the scanning angle indicated in N at that instant is taken as the target angle $\phi o$. As in the arrangement of FIG. 4, the phase value $\psi BO$ must be stored. By suitable choice of the value $\phi k$, the time which elapses between the measurement of $\psi BO$ and the measurement of the target angle $\phi o$ can be made so small that measuring errors are negligible. It will be seen from FIG. 5 that on switch position 3, the signal phase of the fixed (broad) beam is used to adjust the oscillator H phase for actual phase comparisons involving beams A and B on the following two positions of switches I/IV.

Figure 7:
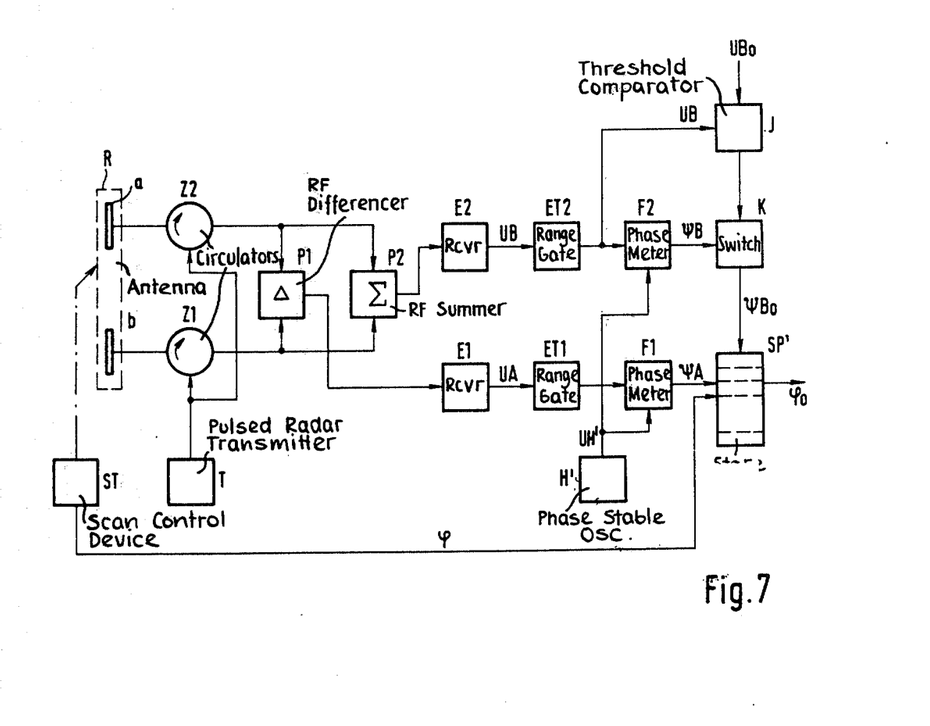
FIG. 7 is a block diagram of an embodiment of the rf direction-finding arrangement according to the invention in which the two radiation patterns have the same symmetry axis (boresite).

In a further alternative solution to the problem, which is coordinated with the first solution shown in FIGS. 4 and 5, the radiation patterns A and B have the same symmetry axes and are effective simultaneously. FIG. 7 shows a block diagram of such an arrangement. To reduce the size of the antenna as in FIG. 5, the patterns A and B are produced by a single antenna R.

Figure 2:
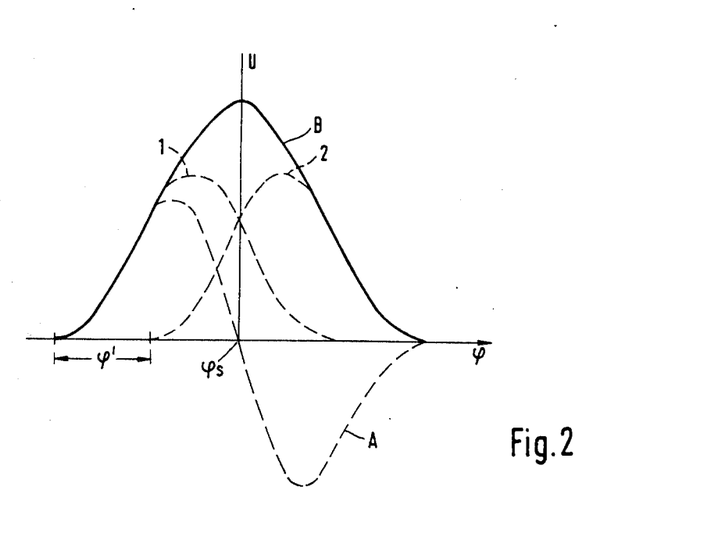
FIG. 2 shows the generation of the radiation patterns used in a system as depicted in FIG. 1.
Figure 8A:
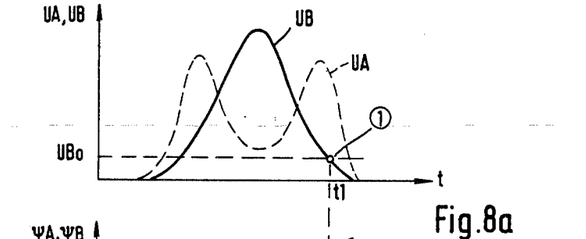
Figure 8B:
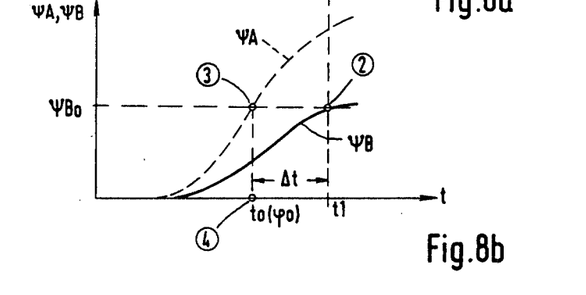

Both patterns are simultaneously used for phase measurement and steadily scanned across the target area. The two halves $a$ and $b$ of the antenna R produce, in known manner, a difference pattern by means of P1 and a sum pattern by means of P2, with the difference pattern corresponding to the pattern A (FIG. 2), and the sum pattern to the pattern B (FIG. 2). When the two patterns of the antenna R are scanned over the target area, the voltages UA and UB as a function of the scanning angle and, consequently, of time (t) are as shown in FIG. 8(a), and the respective phase characteristics ψA and ψB are shown in FIG. 8(b).

The voltages UA and UB appearing at the outputs of P1 and P2, respectively, are amplified in separate receivers E1, E2 and applied through range gates ET1, ET2 to the phasemeters F1, F2. The voltage UB is additionally applied to a threshold comparator stage J which causes the switch K to close as soon as the value UB falls below the predetermined threshold value UBO. In this arrangement, where the patterns A and B, unlike in FIG. 6, have no angular displacement with respect to each other (FIG. 8), the voltage value UBO [FIG. 8(a), point 1] and the corresponding phase value ψBO [FIG. 8(b), point 2] are not measured until after a certain time (ΔT) following the passage through the target angle $\phi_0$ (time to). It is therefore necessary to store a greater number of measured-value pairs ψA (φ) in the storage SP' (FIG. 7) until the reference phase value ψBO is available. To determine the target angle $\phi_0$, the stored measured-value pair ψA' (φ'') at which ψA' = Bo is picked out of SP' in known manner. This scanning angle φ'' is then equal to the target angle $\phi_0$ to be found. In contrast to the arrangements of FIGS. 4 and 5, where only a single measured value ψBO must be stored, an arrangement as shown in FIG. 7 requires the storage of a greater number of measured-value pairs ψA (φ), so the memory capacity of the ψA (φ) - storage SP' must be greater than that of the SP of FIGS. 4 and 5. The arrangement of FIG. 7 has the disadvantage that the time Δt between the measurement of the phase value ψA associated with the target angle $\phi_0$ (instant to) and the measurement of the phase value ψo (instant t1, FIG. 8) is relatively long, but on the other hand presents the advantage that the antenna can be of especially simple and compact design. It is therefore particularly suitable for use in the observation of fixed or slowly moving targets.

If the target is moving, a system parameter, not so far considered, certain problems will arise with any arrangement. As a result of the target movement, the phase values ψA and ψB vary continuously with the Doppler frequency $f_D$ [$f_D = 2v/\lambda$, where $v$ = radial velocity of the target and $\lambda$ = wavelength]. The phasor diagram of a moving target corresponds to the representation of FIG. 3, with the whole diagram rotating at the Doppler-frequency $f_D$. The relative position of the individual phasors remains virtually unchanged as long as the measuring time does not exceed a certain value (of the order of 0.1 sec).

The rotation of the whole phasor diagram at the Doppler frequency $f_D$ can be compensated for by measuring the phases of the vectors UA and UB (FIG. 3) in relation to a phasor also rotating at $f_D$. Theoretically, such a vector could be DB or IB, for example [FIG. 3(e). Since, however, neither DB nor IB is immediately available for measurement, a quantity composed of D and I must be used as the reference phasor, it being necessary that, during the measurement, the phase of this quantity remains constant with respect to D.

Figure 9:
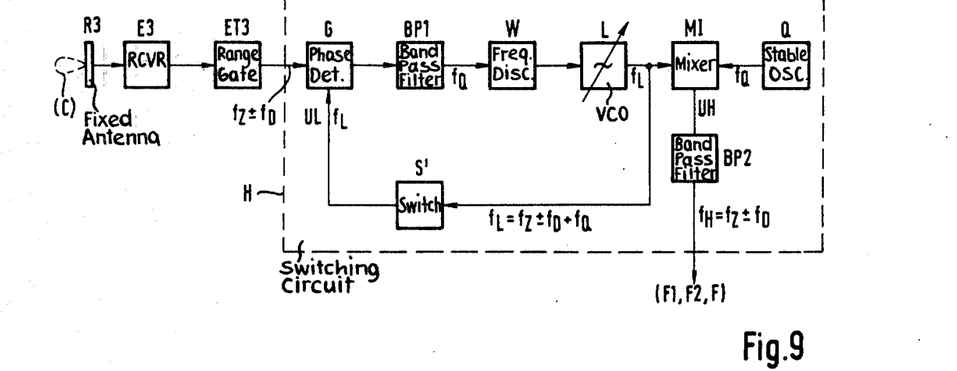
FIG. 9 shows a circuit arrangement for generating the reference voltage required for the phase detectors in the case of moving targets.

To compensate for the influence of the target movement on the phase measurement, one variation on the hereinbefore discussed two basic solutions is characterized in that, for the angle measurement of moving targets providing Doppler-frequency-dependent received voltages, a similarly Doppler-frequency-dependent received voltage of the frequency $f_d \pm f_D$ is generated by means of a third broad radiation pattern [C, FIG. 9], which is space-fixed during the angle measurement and covers the entire scanning sector of the two scanned radiation patterns (A, B). This is used as the reference voltage UH for the phase detectors serving for the phase measurement.

The phase of this reference voltage UH is independent of the scanning angle φ and stable with respect to the phasors DA, DB, IA and IB [FIGS. 3(b) and 3(e)] because the pattern is stationary during the measurement. FIG. 9 shows a circuit arrangement which serves to generate a reference voltage UH having a frequency $f_H = f_z \pm f_D$ with phase stability.

With the arrangement of FIG. 9, the third, space-fixed radiation pattern (C) can be produced by an additional antenna R3 which is not moved during the angle measurement. This is of special advantage in the arrangements of FIGS. 4 and 7.

In the arrangement of FIG. 5, however, which operates on a time-division multiplex basis, according to the invention, the third radiation pattern (C) as well as the first (A) and the second radiation pattern (B) are produced by a single antenna [R, FIG. 5], and the three radiation patterns are successively switched on in such a manner that each time the third radiation pattern is switched on, a constant scanning angle is set. In FIG. 5, this is done by the control unit STC.

In any case, the received voltage derived from the space-fixed pattern (C) is applied from the fixed antenna R3 (FIG. 9) or from the antenna R (FIG. 5) via a receiver E3 and a range gate ET3 gated synchronously with the range gates ET1 and ET2 (FIGS. 4 and 7) or via the receiver E (FIG. 5) and the range gate ET (FIG. 5) to the input of the switching arrangement (H) (FIG. 9).

There, the received voltage is applied to the input of a phase detector (G) whose reference voltage UL is generated by an oscillator (VCO) L whose frequency $f_L$ is controlled in a closed loop comprising a switch (S), the phase detector (G), a band-pass filter BP1 with the mid-band frequency $f_Q$, a frequency discriminator W, and the oscillator L. The closed loop is turned on by the switch S' as soon as the radar has locked on to a target to be tracked. If the frequency at the frequency discriminator W deviates from the frequency $f_Q$, the frequency discriminator W will produce a signal which controls the frequency of the oscillator L to $f_L = f_z \pm f_D + f_Q$. In the mixer MI, this frequency $f_L$ is mixed with the frequency $f_Q$ of a highly phase-stable oscillator Q; thus, after the filtering out of the unnecessary harmonics by means of a band-pass filter BP2, the mixer's output voltage UH, which also is the output voltage of the switching arrangement H, has the frequency $f_H = f_z \pm f_D$ and is free from interference, particularly from clutter, which has a Doppler frequency different from that of the target being observed and still appears at the input of the phase detector G.

On condition that the radar transmitter T (FIGS. 4, 5 and 7) generates phase-coherent rf pulses (known technique in MTI Radar), and that the frequency of the COHO oscillator in the receivers E1 and E2 [FIGS. 4 and 7] and E [FIG. 5] is phase coherent with the transmit frequency, the output voltage UH, which is applied as the reference voltage to the phase meters F1 and F2 or F, will have the same frequency as the signals appearing at the output of the receiver and emanating from the target being observed, independently of the respective velocity of the target. Thus, the phasor diagrams in FIGS. 3(b) and 3(e) also apply for moving targets.

The switching arrangements of FIGS. 4, 5 and 7 thus permit unambiguous angle measurements even in the case of moving targets if the reference voltage UH for the phase meters F1, F2 or F is generated by the switching arrangement H shown in FIG. 9.

For rejecting permanent echoes during the phase measurement, an additional variation is provided for each of the two solutions, which will now be explained by way of example with the aid of FIG. 10.

Figure 10:
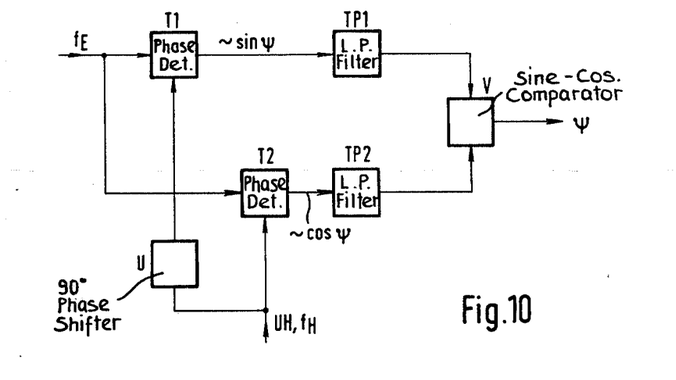
FIG. 10 is a block diagram of a phasemeter (F1, F2, FIGS. 4 and 7; F, FIG. 5).

FIG. 10 shows the block diagram of one of the phase meters F1, F2 and F. The received signals with the frequency $f_E$ coming from a range gate ET1 or ET2 or ET are fed to two parallel-connected phase detectors T1 and T2. The phase-stable reference voltage UH is applied to one of these phase detectors, e.g., T1, via a 90° phase shifter U, and to the other (T2) without phase shift. The target being observed, whose Doppler frequency is $f_D$, provides a received voltage whose frequency $f_E$ is equal to the frequency $f_H = f_Z \pm f_D$ of the reference voltage UH generated as shown in FIG. 9. The phase detectors T1 and T2 provide dc voltages whose amplitudes correspond, respectively, to the sine and cosine of the phase angle $\psi$ between the received voltage and the reference voltage UH.

In a second improvement, these phase detectors T1 and T2 are followed by low-pass filters TP1 and TP2, respectively, whereby interfering targets, whose Doppler frequency differs from $f_D$, particularly fixed targets, and which therefore cause at the outputs of the phase detectors T1 and T2 ac voltages (having the frequency $f_D$ in the case of permanent echoes), are suppressed. From the sine and cosine values, a device V (which may be called a sine-cosine comparator) ultimately produces, in known manner, the net phase angle $\psi$, which is thus free from clutter.

The solutions described so far are based on the assumption that the interference signals are clutter signals or isolated, discrete interference signals which occur with relatively high power, arbitrary phase spacing $\eta$ and solid angle $\gamma$ with respect to the direct-path signals. For such interference signals or multipath interference, the direction-finding errors remain within narrow limits if the solution according to the invention is used. The probability that more than one isolated, strong interfering reflector (e.g., different specular reflections during an angle measurement) will occur is very small. Nevertheless, under especially unfavorable circumstances (e.g., at extremely low useful level), such a possibility cannot be completely ruled out, and direction-finding errors may be caused.

In a still further variation applicable to each of the previously discussed embodiments therefore, a monitor is used which provides an automatic indication when a measured value is correct.

To this end, the monitor is operated if, in the course of the scanning motion and within a predetermined time which begins when the second received voltage UB reaches a predetermined value UBO, the scanning-angle-dependent phase change of this second received voltage reaches a predetermined value, too, and the monitor is not reset until the next measuring period begins.

An embodiment of this additional feature will now be explained in more detail with the aid of FIGS. 12(a) to 12(c).

First of all, the theoretical basis for the check circuit of FIG. 12(a) will be explained with the aid of FIGS. 11(a), 11(b) and 11(c).

Figure 11A:
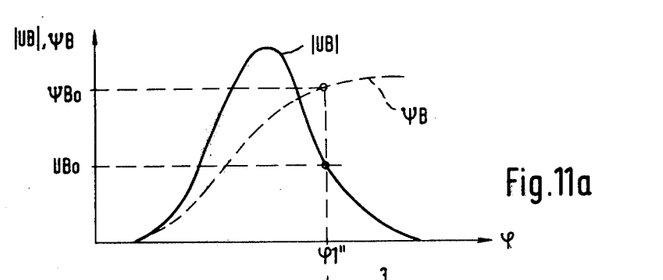
FIGS. 11(a)–(c) show the angular dependence of the phase ψB of the received voltage UB for a correct and a false measurement, and the angular dependence of the phase ψB differentiated with respect to the scanning angle φ, respectively.
Figure 11B:
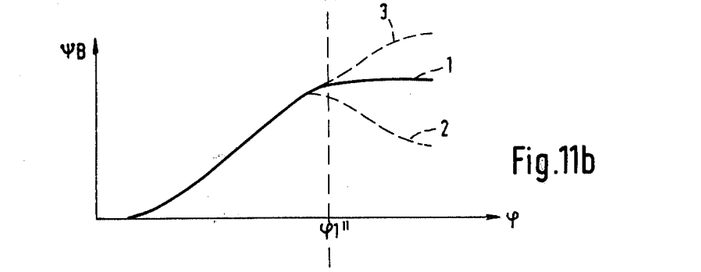

FIG. 11(a) again shows the radiation pattern B and the associated phase characeristic $\psi B$. The phase value $\psi BO$ used for the angle determination is measured in the exponentially falling portion of the pattern B at a predetermined value UBO [angle $\phi_1''$, FIG. 11(a)]. Below the operating point fixed in this way, i.e., at a scanning angle $\phi > \phi_1''$, the phase $\psi B$ varies but little if, in addition to the direct-path signal, only one discrete, indirect-path radiation occurs.

If further indirect-path signals occur, however, the phase characteristic below the operating point will change even if the power of these indirect-path radiations is relatively low because in this region the amplitude of the direct-path radiation and, consequently, the latter's influence on $\psi B$, is greatly reduced. The curve 1 of FIG. 11(b) shows schematically the phase characteristic in the event that, besides the direct-path signal, only one indirect-path signal occurs at an angular distance $\gamma = 0.03 \theta$ ($\theta$ = half-power beamwidth of the pattern B) and with a relative phase of $\eta = 45°$.

The curve 2 corresponds to the case in which a second interference radiation is present at about $\gamma = 0.05 \theta$ and having a phase difference from the direct-path radiation of $\eta = 0°$. The curve 3 applies for the case in which the second interference radiation has a phase difference of $\eta = 180°$ from the direct-path radiation. The curves of FIG. 11(c) show the corresponding angular dependence of the phase change d $\psi B/d\phi$. As is apparent from these curves of FIG. 11(c), the magnitude of the angle-dependent phase change d $\psi B/d\phi$ can be used to distinguish between "correct" measured values (curve 1, only one discrete interference signal) and "false measured values (curves 2 and 3, several discrete interference signals).

Figure 11C:
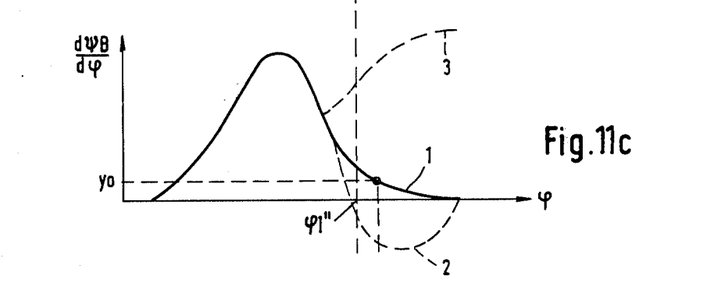

The criterion for the fact that a measurement is "normal" and gives a correct measured value is that the value of the derivative d $\psi B/d\phi$ tends to zero within a given angular range $\Delta \phi'$ after the angle $\phi_1''$ (at which UB=UBO) has been reached, whereas at the occurrence of several interference signals which would lead to false maeasurement results, d $\psi B/d\phi$ differs from zero considerbly in this angular range [curves 2 and 3, FIG. 11(c)].

Figures 12A, 12B:
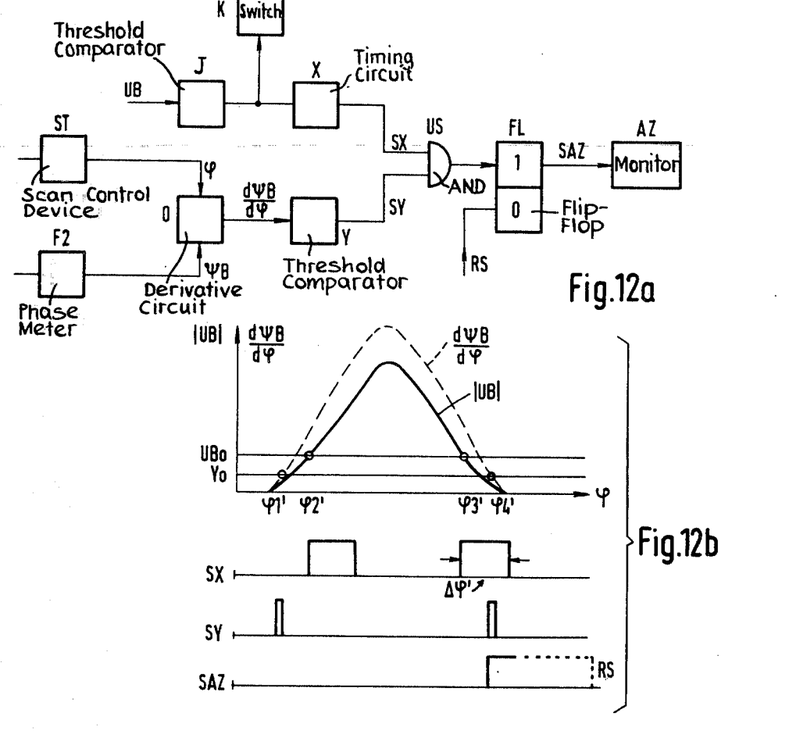
FIG. 12(a) is a block diagram of an embodiment of a check circuit according to the invention.
FIG. 12(b) shows the amplitude variation and the phase variation if only one discrete interference signal occurs, and the respective pulses generated by the check circuit.

This criterion is used in the check circuit shown in FIG. 12(a). This check circuit can be used in conjunction with any of the arrangements of FIGS. 4, 5 or 7.

The devices J and K have the same functions as the devices designated by like reference characters in FIGS. 4, 5 and 7. The devices ST and F2 are identical with the devices designated by like reference characters in FIGS. 4 and 7, but if the check circuit of FIG. 12(a) is used in conjunction with the arrangement of FIG. 5, ST and F2 must be regarded as the devices designated din FIG. 5 by STA and F, respectively.

If the signal UB fed to the threshold comparator stage J is equal to UBO, the stage J will produce a signal which closes the switch K and simultaneously triggers a timing circuit X at whose output a signal SX appears for a predetermined time TX. This signal is applied to one input of an AND circuit US. FIG. 12(b) indicates the nature of this output SX, variable as a function of $\Delta \phi'$. In the device O, the value d $\phi B/d\phi$ is formed, in known manner, from the values $\psi B$ and $\phi$, which are supplied by the phase meter F2 and by the control unit ST, respectively. This value is fed to a threshold comparator stage Y. As soon as this value has reached a predetermined reference value Yo, the threshold comparator stage Y produces a short-time signal SY, which is applied to the other input of the AND circuit US. If this signal appears during the time the output of the timing circuit X is marked, the output signal of the AND circuit US will set an RS flip-flop FL, whose signal SAZ appearing at the 1 output activates the monitor AZ. The flip-flop FL and, consequently, the monitor AZ are not reset until the next measuring period begins.

This monitor can, of course, also be used to suppress false measured values, e.g., by releasing the read-out display only if the measured value has been formed under correct conditions.

The pulse diagram of FIG. 12(b) shows the operation of the check circuit according to the invention, it being assumed that the measurement is correct, i.e., that the d $\psi B/d\phi$ characteristic corresponds to the curve 1 of FIG. 11(c).

At the angle $\phi_1'$, the value of d $\psi B/d\phi$ reaches the reference value YO, whereby a short-time signal SY appears at the output of Y. At the angle $\phi_2'$, UB reaches its reference value UBO, which, however, is not the correct measuring point [cf. FIG. 3(f)]. As a consequence, the monitor AZ is not operated (see SAZ).

If, however, the voltage UB reaches its reference value UBO at the correct measuring point $\phi_3'$, and if d $\psi B/d\phi$ reaches its reference value YO at the angle $\phi_4'$, the monitor AZ will be operated provided that the difference $\phi_4' - \phi_3'$ is smaller than $\Delta\phi'$, with $\Delta\phi'$ being determined from the time constant TX of the timing circuit X and the scan-rate $d\phi/dt$ according to the equation $\Delta\phi' = (TX) d\phi/dt$. The check signal SAZ does not disappear again until the flip-flop FL is reset by a signal RS at the beginning of the next measuring period. In case of a faulty measurement, d $\psi B/d\phi$ reaches the reference value YO only outside the angular range $\Delta\phi'$, so the monitor AZ will not be operated.

Figure 12C:
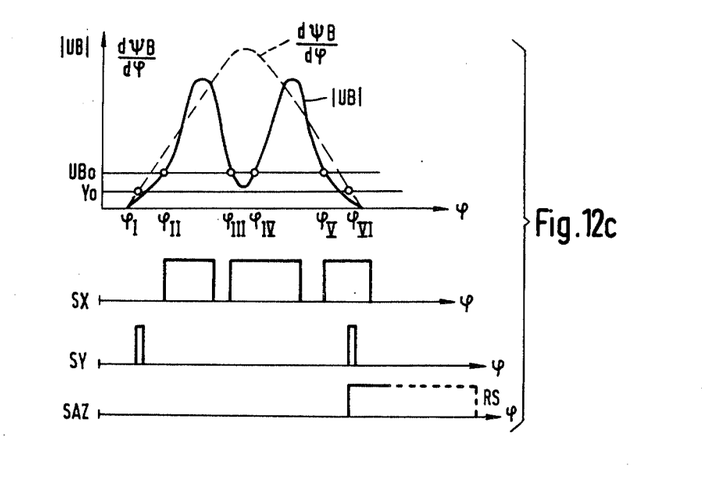
FIG. 12(c) shows the amplitude variation and the phase variation in case of amplitude ambiguities with a single discrete interference signal, and also the respective pulses generated by the check circuit.

FIG. 12(c) shows how measuring errors which are due to amplitude ambiguities can be detected by means of the check circuit according to the invention. The ambiguous amplitude response shown in FIG. 12(c) is obtained if the phase angle $\eta$ between direct and indirect-path radiation is about 180°, and if the amplitudes are about equal. It can be seen that UB reaches the reference value UBO in several angular positions ($\phi_{II}$, $\phi_{III}$, $\phi_{IV}$, $\phi_V$), in which case only the $\psi BO$ value measured at the scanning angle $\phi_V$ is correct. As the d $\psi B/d\phi$ characteristic of FIG. 12(b) shows, faulty measurements are detected nevertheless, because the signal SY appearing at the two scanning angle values $\phi_I$ and $\phi_{VI}'$ at which $d\psi B/d\phi$ reaches the reference value YO, lies only at $\phi_{VI}$ within an angular range which begins at the attainment of the reference value UBO and has the length $\Delta\phi'$. Thus, the check signal SAZ indicating a correct measurement appears only at the angle $\phi_{VI}$. To avoid any disturbance due to false values, measured at, e.g., $\phi_{VI}$ [FIG. 12(c)], the storage device SP (FIGS. 4 and 7 is designed so that, on the arrival of a new $\psi BO$-value (e.g., of the value measured at the angle $\phi_V$, it stores this new value without delay.

In referring to energy emanating from a target, a directional angle of which is to be determined, it is intended that this language covers reflected energy resulting from illumination of the target synchronously from the measuring radar site and in the broad sense also energy radiated independently from the target, although the system of the invention is primarily adapted for use in a pulsed radar transmitter/receiver configuration.

What is claimed is:

1. A scanning direction-finding system for reducing the effect of multipath reception on the accuracy of angular determinations, said system having means for developing at least first and second antenna patterns, through each of which, radio frequency energy emanating from a target is separately received, said first antenna pattern including a null along its axis of angular symmetry and said second antenna pattern having a maximum along its axis of angular symmetry, comprising:

first means for displacing the effective symmetry axes of said patterns by a predetermined angle with respect to each other;

second means for continuously and separately measuring the phase of energy received through each of said first and second patterns;

third means for storing the phase value measured through one of said antenna patterns along with corresponding scan angle identifications whenever the amplitude of a selected one of said phase values crosses a predetermind threshold value;

and fourth means for determining the target angle on the basis of equality of said phase value stored in said third means with the instantaneous phase measured through the other of said antenna patterns, said target angle being that corresponding to said stored phase value.

2. A direction-finding system according to claim 1 in which said antenna patterns are produced by two separate antennas mechanically offset to provide said symmetry axis displacement for determining said phase values.

3. A direction-finding system according to claim 1, in which said two radiation patterns are produced by a single antenna, the radiation patterns thereof being used successively for phase measurement, and said first means operates such that, each time said second pattern is used for phase measurement, the scanning angle is displaced by a predetermined angle from the value set for the phase measurement of the first received voltage.

4. In an rf direction-finding arrangement with scanned radiation patterns a first of which has a minimum along the symmetry axis, and a second of which has a maximum along the symmetry axis, particularly for elevation measurement by means of a radar set which includes means for continuously defining the scanning angle, means for reducing the effect of multipath interference, said antenna patterns having congruent symmetry axes and being produced by a single antenna, comprising:

first means for generating an analog signal continuously representative of the angles of the symmetry axes of said patterns, said first means also including switching circuits for time sharing said patterns to produce an effective relative axis offset between said patterns;

second means for continuously measuring the phases through said antenna patterns contemporaneously;

a storage device in which the phase values of the first received voltage are stored together with the associated scanning angles of said first radiation pattern;

third means for measuring the phase values of a second received voltage through said second antenna pattern, when said second received voltage falls below a predetermined value and for comparing with the phase values stored in said storage device; and fourth means for taking the target angle as that scanning angle whose associated phase value corresponds to the phase value determined in said comparison.

5. A direction-finding arrangement according to claim 2 and including coherent phase detectors for the angle measurement of moving targets providing Doppler-frequency-dependent received voltages, including a third radiation pattern which is fixed and covers the scanning range of the two scanned radiation patterns for deriving an independent Doppler-frequency-dependent received voltage applied to generate a reference voltage for said phase detectors.

6. A direction-finding arrangement according to claim 5 including means for clutter rejection comprising low-pass filters following said phase detectors.

7. An rf direction-finding arrangement according to claim 6 in which said third antenna pattern is produced by an additional antenna which is substantially angularly stationary during the angle measurement.

8. A direction-finding arrangement according to claim 6 in which the first, second and third (C) radiation patterns are generated by a single antenna and including means whereby the three radiation patterns are switched on in succession such that each time the third radiation pattern is switched on, a constant scanning angle is set.

9. A direction-finding arrangement according to claim 1 including additional means for monitoring said angle measurement, said monitoring means being operated if, in the course of the scanning motion, within a predetermined angular range, the value $\Delta\phi$, which begins when the second received voltage (UB) reaches a predetermined value $UB_o$, the scanning-angle-dependent phase change $d\psi B/d\phi$ of said second received voltage reaches a predetermined value $Y_o$, contemporaneously, said monitoring means indicating substantially error-free angle measurement under these circumstances.

* * * * *